(12) United States Patent
Schneider et al.

(10) Patent No.: US 12,379,458 B2
(45) Date of Patent: Aug. 5, 2025

(54) METHOD AND RADAR SYSTEM FOR DETECTING TARGETED RADAR INTERFERENCE

(71) Applicant: NXP B.V., Eindhoven (NL)

(72) Inventors: Tobias Schneider, Graz (AT); Eduardo Pimentel de Alvarenga, Graz (AT); Marcel Medwed, Graz (AT); Erik Kraft, Graz (AT); Stefan Lemsitzer, Stainz (AT); Robert Spreitzer, Graz (AT)

(73) Assignee: NXP B.V., Eindhoven (NL)

( * ) Notice: Subject to any disclaimer, the term of this patent is extended or adjusted under 35 U.S.C. 154(b) by 422 days.

(21) Appl. No.: 17/938,430

(22) Filed: Oct. 6, 2022

(65) Prior Publication Data

US 2024/0118380 A1 Apr. 11, 2024

(51) Int. Cl.
*G01S 7/02* (2006.01)
(52) U.S. Cl.
CPC .................... *G01S 7/023* (2013.01)
(58) Field of Classification Search
CPC ...... G01S 7/023; H04B 1/7176; H04B 1/7172
See application file for complete search history.

(56) References Cited

U.S. PATENT DOCUMENTS

| 6,618,003 | B2 * | 9/2003 | Voigtlaender | ......... G01S 13/931 342/162 |
| 2002/0067304 | A1 | 6/2002 | Klinnert et al. | |
| 2010/0195699 | A1 * | 8/2010 | Liu | ....... H04B 1/7176 375/130 |
| 2017/0131394 | A1 * | 5/2017 | Roger | .................... G01S 13/343 |
| 2017/0257773 | A1 * | 9/2017 | Boudreau | ............. H04W 16/14 |
| 2018/0088223 | A1 * | 3/2018 | Yano | .......................... G01S 7/36 |
| 2020/0120594 | A1 * | 4/2020 | Nabki | ................ H04B 1/71632 |
| 2021/0063562 | A1 | 3/2021 | Leong et al. | |

(Continued)

FOREIGN PATENT DOCUMENTS

CN 110927706 B 5/2022

OTHER PUBLICATIONS

Petit, J., Stottelaar, B., & Feiri, M. (2015). Remote Attacks on Automated Vehicles Sensors : Experiments on Camera and LiDAR. (Year: 2015).*

(Continued)

*Primary Examiner* — Vladimir Magloire
*Assistant Examiner* — Peter Davon Doze

(57) ABSTRACT

A method is provided for detecting interference in a radar system. The method includes transmitting, by a transmitter of the radar system, a sequence of radar pulses at a regular interval with a rest period following each radar pulse of the sequence of radar pulses. The transmitter is disabled during each rest period. A receiver is enabled to receive reflected radar pulses from a target during the rest period following each radar pulse of the sequence of radar pulses. Some of the radar pulses are selected to be omitted and not transmitted. The receiver is still enabled during the rest periods following the omitted transmission pulses. Any reflected pulses received during the rest periods following the omitted transmission pulses may be an indication of a targeted interference of the radar system. In another embodiment, a radar system is provided.

19 Claims, 4 Drawing Sheets

(56) References Cited

U.S. PATENT DOCUMENTS

2022/0268884 A1    8/2022    Wu et al.

OTHER PUBLICATIONS

Petit, Jonathan et al.; "Remote Attacks on Automated Vehicles Sensors: Experiments on Camera and LiDAR"; Black Hat Europe, Nov. 2015, Amsterdam, Netherlands; https://www.blackhat.com/docs/eu-15/materials/eu-15-Petit-Self-Driving-And-Connected-Cars-Fooling-Sensors-And-Tracking-Drivers-wp1.pdf.
Liang, Xiaolin et al.; "Ultra-Wideband Impulse Radar Through-Wall Detection of Vital Signs"; Scientific Reports 8; Article No. 13367 (2018); Received Jan. 10, 2018; Published Sep. 6, 2018; DOI: https://doi.org/10.1038/s41598-018-31669-y.
Meager, Geoffrey et al.; "Estimation and Cancellation of High Powered Radar Interference for Communication Signal Collection"; 2016 IEEE Radar Conference, Philadelphia, PA; May 2-6, 2016; DOI: 10.1109/RADAR.2016.7485263.
Umehira, Masahiro et al.; "An Adaptive Interference Detection and Suppression Scheme Using Iterative Processing for Automotive FMCW Radars"; 2020 IEEE Radar Conference (RadarConf20), Sep. 21-25, 2020, Florence, Italy; DOI: 10.1109/RadarConf2043947.2020.9266712.
Wang, Feng et al.; "DRFM Jamming Suppression for Radar Exploiting Linear Frequency Modulation Transmission"; Published in: 2016 CIE International Conference on Radar (RADAR), Oct. 10-13, 2016, Guangzhou, China; DOI: 10.1109/RADAR.2016.8059367.

\* cited by examiner

METHOD AND RADAR SYSTEM FOR DETECTING TARGETED RADAR INTERFERENCE

BACKGROUND

Field

This disclosure relates generally to radar, and more specifically, to a method and radar system for detecting targeted radar interference.

Related Art

Impulse Radio Ultra-Wideband (IR-UWB) radar technology as set out in IEEE standard 802.15.4z is used for indoor ranging and localization applications and IR-UWB devices operate in a frequency range of approximately 3 GHz to 10 GHz to provide relatively low-cost and low-complexity ranging. This type of ranging device has a wide range of applications. For example, this type of ranging device can be used for detecting objects for applications like detecting a human presence, movement of people in a room, or medical applications such as detecting breathing.

A malicious user can mount an attack using a signal generator device to forge radar reflections on a radar system to alter the system perception of the environment. This attack can be used to mask targets from radar detection as well as to introduce fake targets. Both scenarios significantly impact the security guarantees of the targeted system.

Prior approaches to detect radar interferences rely on complex computations or special hardware modifications.

Therefore, a need exists for a method to detect targeted radar inference that provides real-time lightweight detection.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
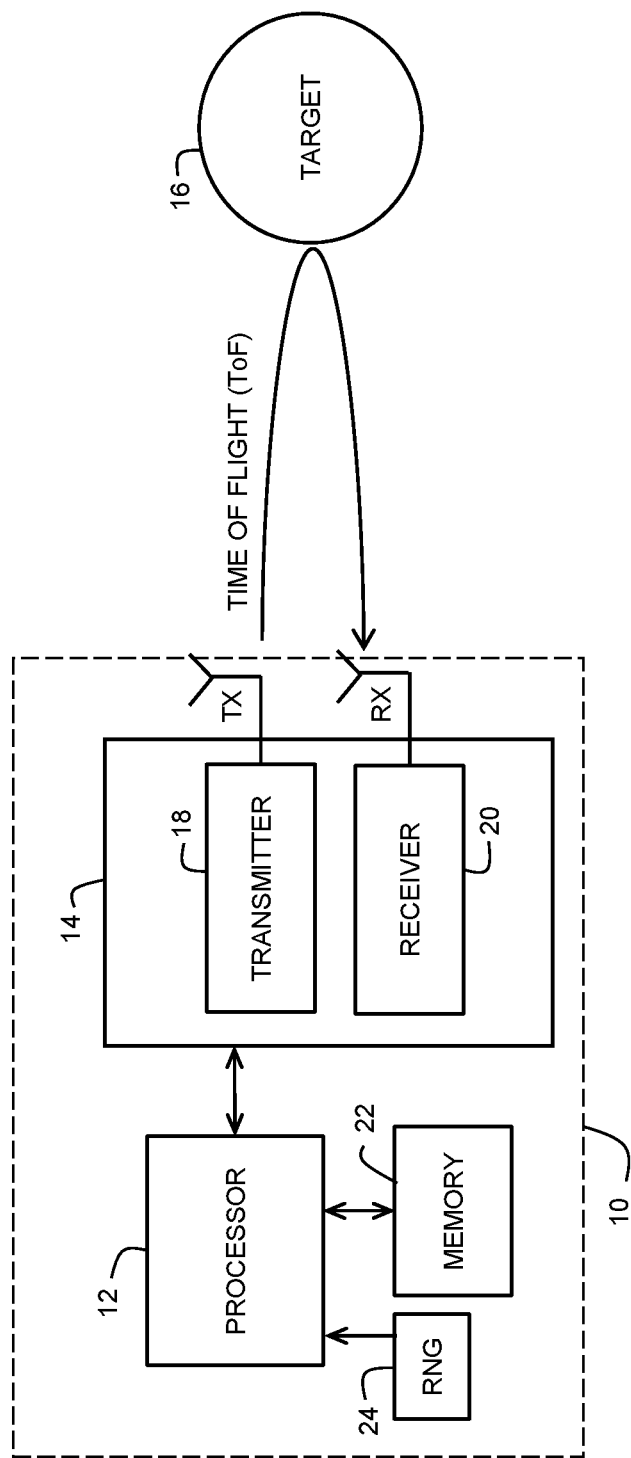
FIG. 1 illustrates a radar system in accordance with an embodiment.

Generally, a radar flow of a pulsed radar transceiver includes a sequence of transmitted radar pulses interleaved with rest periods. A reception period is enabled during each of the rest periods to receive reflections from the transmitted radar pulses. To detect targeted interference by an attacker, random detection intervals are introduced. In one embodiment, the random detection intervals may be implemented in software of the radar system. The radar system randomly omits a pulse transmission (tx) step of a sequence of transmitted pulses, but still runs through the subsequent reception (rx) steps. The radar system can then analyze the received reflections and judge, based on amplitude values, if these reflections are genuine reflections from a previously transmitted pulse, or if they have been introduced by another device. If the pulses were introduced by another device, the radar system can be configured to determine a likelihood of this being benign interference or an intended attack.

Due to the short lifespan and relatively high speed of a genuine radar pulse, malicious pulse generators need to send malicious pulses at a constant rate and may not be able to react to seeing a genuine pulse before deciding to emit a malicious pulse. The disclosed radar system may be useful for detecting this type of attack.

In accordance with an embodiment, there is provided, a method for detecting interference in a radar system, the method including: transmitting, by a transmitter of the radar system, a sequence of radar pulses having a predetermined magnitude at a regular interval with a rest period following each radar pulse of the sequence of radar pulses, wherein the transmitter omits a pulse during each rest period; enabling a receiver to receive reflected radar pulses from a target during the rest period following each radar pulse of the sequence of radar pulses; and selecting radar pulses to be omitted from the sequence of radar pulses, wherein the receiver is still enabled during the rest periods following the omitted pulses. The method may further include providing an indication of a false reflection in response to receiving an unexpected reflection during a rest period following an omitted pulse. Selecting radar pulses to be omitted may further include selecting partial pulses, pulses that have a lower magnitude than the predetermined magnitude, or a combination thereof. The radar may be an Impulse Radio Ultra-Wideband (IR-UWB) radar. The method may be implemented as a computer program comprising instructions stored in a non-transitory storage medium, wherein when executed by a processor of the radar system, the instructions perform the method. Selecting radar pulses to be omitted may further include randomly selecting radar pulses to be omitted from the sequence of radar pulses. The method may further include detecting an unexpected reflection during a rest period and analyzing the unexpected reflection for targeted interference by an attacker. The method may further include analyzing received reflected radar pulses for target range from the radar system. Selecting pulses to be omitted may further include randomly selecting pulses to be omitted from the sequence of radar pulses based on a biased distribution.

In another embodiment, there is provided, a method for detecting interference in a radar system, the method including: enabling a sequence of transmission steps of a transmitter of the radar system at a regular interval, wherein rest periods are interleaved between adjacent transmission steps; enabling a sequence of reception steps of a receiver of the radar system, a reception step corresponding to each of the rest periods; randomly omitting a transmission step from the sequence of transmission steps while maintaining the sequence of reception steps; and providing an indication of interference in response to a reception step following an omitted transmission step receiving an unexpected reflection. The unexpected reflection may be caused by a pulse generator external to the radar system. The radar may be an Impulse Radio Ultra-Wideband (IR-UWB) radar. The method may be implemented as a computer program comprising instructions stored in a non-transitory storage medium, wherein when the instructions are executed by a processor of the radar system, perform the method. Randomly omitting a transmission step from the sequence of transmission steps may further include randomly omitting the transmission step based on a biased distribution. In response receiving the unexpected reflection, analyzing the unexpected reflection for targeted interference by an attacker. The method may further include analyzing received reflected radar pulses for target range from the radar system.

In yet another embodiment, there is provided a radar system including: a transmitter configured to transmit a sequence of pulses during transmission steps via a transmit antenna, wherein rest periods are interleaved between adjacent transmission steps; a receiver configured to receive reflected signals from a target during the rest periods following each transmission step; and a processor coupled to the transmitter and to the receiver, the processor configured to select a pulse of the sequence of pulses to omit from transmission while continuing all the reception steps following each transmission step. The transceiver may be an impulse radio ultra-wideband (IR-UWB) radar transceiver. The processor may be further configured to randomly selecting pulses to omit. The processor may be further configured to provide an indication of a false reflection in response to receiving a reflection during a reception step following an omitted pulse.

FIG. 1 illustrates simplified radar system 10 in accordance with an embodiment. Radar system 10 may be an impulse radio ultra-wideband (IR-UWB) radar system and implemented on one or more integrated circuits. In radar system 10, transceiver 14 includes transmitter 18 connected to a transmit antenna labeled "TX" and receiver 20 is connected to a receive antenna labeled "RX". Processor 12 is coupled to control the operations of transceiver 14. Memory 22 is coupled to processor 12 and stores instructions and/or data useful for implementing the disclosed embodiment. Random number generator 24 is coupled to processor 12. Transmitter 18 transmits a signal via the transmit antenna (TX). The signal is reflected from target 16, and the reflected portion of the signal is received by receiver 20 via the receive antenna (RX). Note that in other embodiments, transmitter 18 and receiver 20 may share a single antenna. The time of flight (TOF) required for the signal to make the trip from transmitter 18 to target 16 and back to the receiver 20 is used to calculate a range to target 16. Time TMEAS (not shown) is measured from a start time TSTART from processor 12, back to processor 12. Using time TMEAS, processor 12 calculates the distance to the object using the formula: Distance=ToF×c/2=TMEAS×c/2, where c is the speed of light. Depending on the material makeup of target 16, the reflected portion will have a much lower amplitude than when it was transmitted.

In one embodiment, transmitter 18 is configured to transmit a sequence of pulses during transmission steps via the transmit antenna. Rest periods are interleaved between adjacent transmission steps and transmitter 18 may be disabled during the rest periods. Transmitter 18 emits a radar pulse during each transmission step. Receiver 20 is configured to receive reflected signals from target 16 via the receive antenna during the rest periods. A reception step follows each of the transmission steps. Processor 12 is configured to select transmission steps of the sequence of pulses to omit, and transmitter 18 is disabled and does not emit a pulse for an omitted transmission step. The reception step following the disabled transmission step remains enabled. In one embodiment, transmission steps to omit from sequence 30 may be randomly selected using random number generator 24. In another embodiment, pulses to omit may be selected differently. When a transmit pulse is omitted, a reflected pulse is not expected to be detected during the subsequent corresponding reception step. If a reflected pulse is detected, the reflected pulse is unexpected and may indicate a targeted interference attack.

Figure 2:
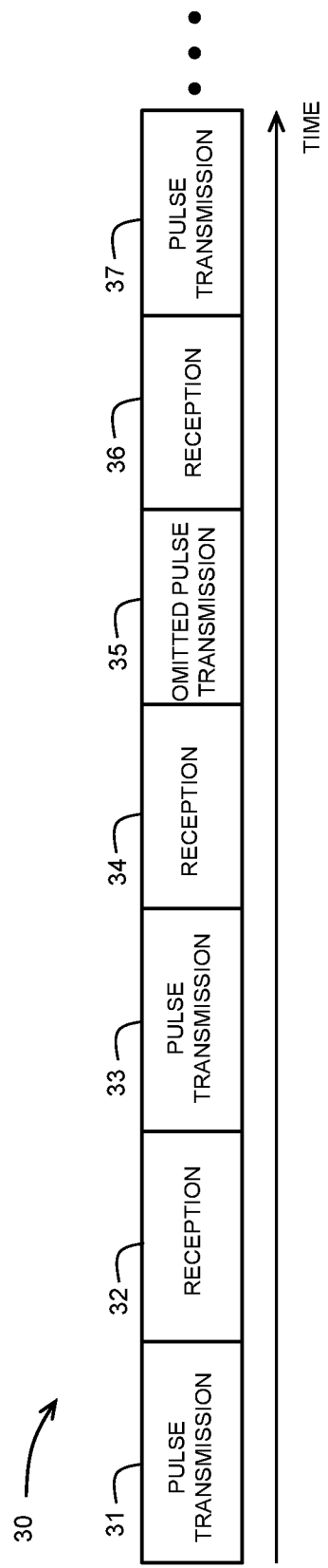
FIG. 2 illustrates a timing diagram of transmission and reception steps of the radar system in accordance with an embodiment.

FIG. 2 illustrates a timing diagram of sequence 30 of transmit and receive steps of radar system 10 of FIG. 1 in accordance with an embodiment. Sequence 30 is a portion of a larger sequence and includes pulse transmission steps 31, 33, 35, and 37 and reception steps 32, 34, 36. Note that pulse transmission step 35 has been marked omitted, which means that the radar transmitter, such as transmitter 18 in FIG. 1, is not enabled to transmit a pulse during that transmission pulse.

During normal operation of radar system 10, each transmission step 31, 33, 35, and 37 is followed by transmission rest periods where no pulses are transmitted. The transmission rest periods are used as reception steps for receiver 20 to detect reflected pulses from the transmission steps. For example, reception step 32 is enabled to receive reflected radar pulses from pulse transmission step 31. Reception step 34 is for receiver 20 to detect reflected pulses from pulse transmission step 33. Reception step 36 is for receiver 20 to detect reflected pulses from pulse transmission step 35. However, the pulse that was supposed to be transmitted at transmission step 35 is omitted by processor 12. Receiver 20 is enabled at reception step 36 that immediately follows transmission step 35. Therefore, because a pulse was not transmitted, a reflected pulse is not expected to be detected by reception step 36 except maybe weak reflections of remaining bounces of previous pulses. However, if a pulse is detected by receiver 20 at reception step 36, it may mean that a pulse generator from an attacker is attempting to deceive radar system 10. An attacker can configure a software defined radio (or other similar signal generator devices) to generate maliciously crafted adversarial signals that simulate reflection patterns to mimic a desired outcome, e.g., mimicking the reflections that would be seen on an empty room and with that masking a potential person standing in the room. If an attacker device is detected, the receiving step may still see strong reflections that are unexpected and processor 12 may then raise an alert to a host system to decide if the operation should continue or be aborted.

Figure 3:
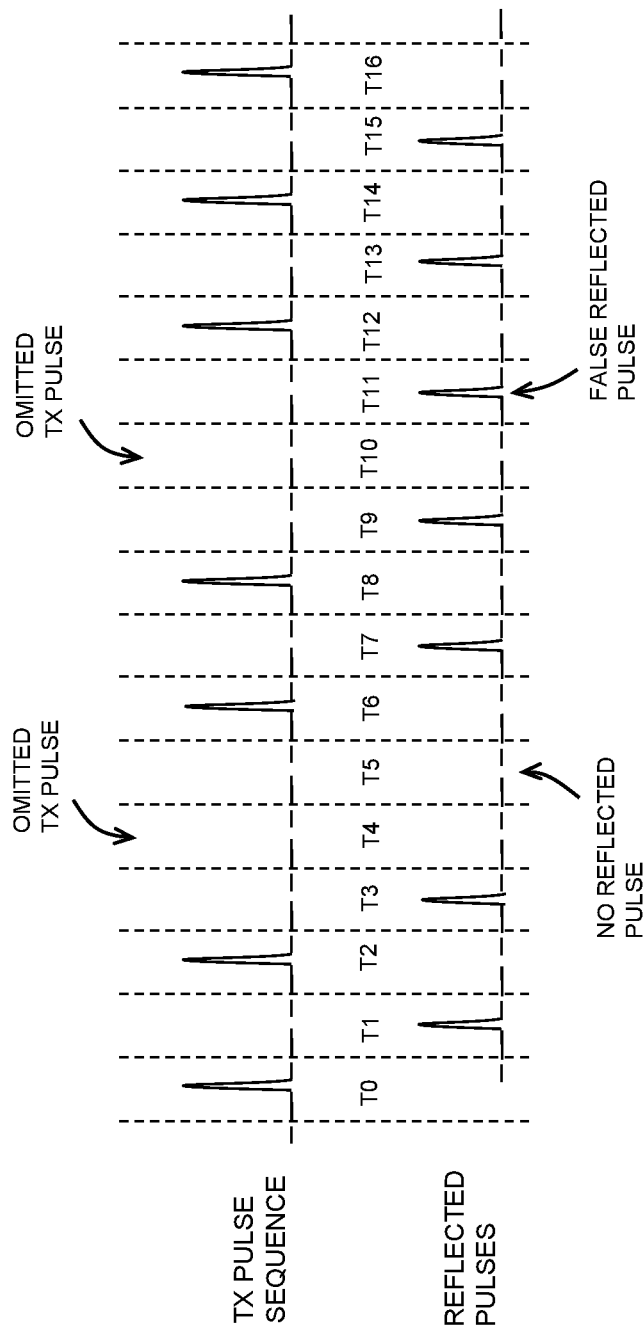
FIG. 3 illustrates a waveform of transmitted pulses and corresponding reflected pulses in accordance with an embodiment.

An UWB radar emits pulses with a known and predictable shape. Then the UWB radar switches to receiving mode and cross correlates the observations with the emitted pulse to determine a distance to reflective objects. These pulses are transmitted at regular intervals with specific rest phases that can be monitored and predicted by a third-party device. FIG. 3 illustrates a waveform of transmitted pulses and corresponding reflected pulses in accordance with an embodiment. The shapes of the pulses in FIG. 3 are for illustration purposes only and are not important for describing the disclosed embodiment. An actual pulse may have a different shape. The waveform of FIG. 3 is divided into time periods T0-T16. A transmitted pulse is shown in even time periods T0, T2, T4, T6, T8, T10, T12, T14, and T16. A reception period follows each transmitted pulse in the odd time periods T1, T3, T5, T7, T9, T11, T13, and T15. In the sequence of TX pulses, a TX pulse is intentionally omitted at time T4. No reflected pulse is received at the following time T5, which is expected. Another pulse is omitted at time T10. At the next time period T11, the receiver detects a relatively strong pulse. However, the reflected pulse at T11 is not expected because a pulse was not transmitted at time T10. An alert can be raised, and an action can be taken such as discontinuing the operation. Also, the reflected pulse at T11 may be analyzed for more information.

To avoid detection, the attacker may stop the adversarial response early if the attacker detects no transmitted pulse. The attacker may reduce the strength of the adversarial signal and still trick the detection algorithm. To overcome this, in one embodiment, instead of disabling the transmitter completely during a transmission step and sending no pulse, a partial pulse, a pulse with lower magnitude, or a combination thereof may be transmitted. The attacker may not as easily detect the partial pulse and thus fail to abort their adversarial signal.

Figure 4:
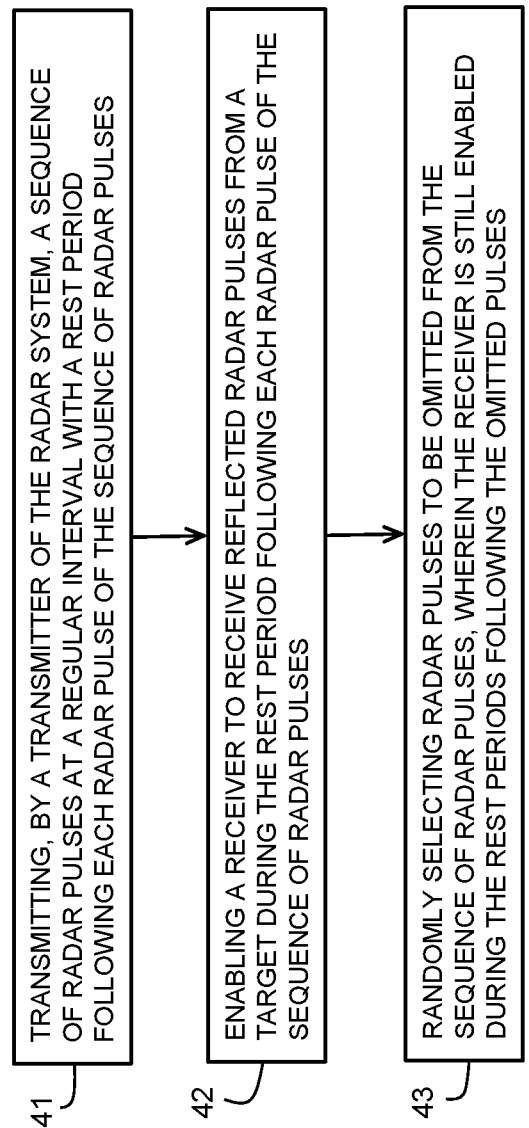
FIG. 4 illustrates a method for detecting radar interference in accordance with an embodiment.

FIG. 4 illustrates method 40 for detecting radar interference in accordance with an embodiment. Method 40 begins at step 41. At step 41, a transmitter of the radar system transmits a sequence of radar pulses at a regular interval with a rest period following each radar pulse of the sequence of radar pulses. At step 42, a receiver is enabled to receive reflected radar pulses from a target during the rest period following each radar pulse of the sequence of radar pulses. At step 43, radar pulses to be omitted are randomly omitted from the sequence of radar pulses, however the receiver is still enabled during the rest periods following the omitted pulses. Note that omitted pulses are pulses that are not transmitted during their normal transmit time period. If a pulse is received during a rest period following an omitted pulse, then the reflected pulse may have been transmitted by an external pulse generator of an attacker.

In one particular embodiment of the above method, randomly selected intervals are introduced where the radar system does not execute the transmission step. That is, the transmitter remains silent for that round. Under normal conditions, the receiving step following the missed transmission step would not see any reflections, except maybe very weak reflections resulting from remaining bounces of previous pulses, as mentioned above. On the other hand, if an attacker device is present, the receiving step will still see strong reflections that are unexpected. An alert can be raised to alert a host processor to decide if the operation should continue or be aborted. One possible radar flow with detection capability can be described as follows on a high level:

1) DetectionRound←RNG(0,1)
2) If DetectionRound==0
   a. Pulse Transmission (tx step)
3) Response=Reception (rx step)
4) If DetectionRound==1
   a. Analyze Response for targeted interference
   b. Goto Step 1
5) Analyze Response for normal radar functionality
6) Goto Step 1

In the flow, "Pulse Transmission", "Reception", "Analyze Response for normal radar functionality" refer to the available functionality of the radar system. "DetectionRound" is a switch that is randomly sampled and can be either set to "0" or "1". The random number generator "RNG" samples from a biased distribution, which is adapted depending on the use case. The probability of "1" determines the overhead and detection latency introduced by the processing flow. A higher probability of "1" results in a low detection latency with decreased radar performance. For example, for practical applications, the RNG can be configured to sample 0 with 99% probability, and 1 with 1%. This may have a negligible impact on the radar performance, and still allow for real-time detection if the radar rate is sufficiently high. "Analyze Response for targeted interference" analyses a received response to decide if a targeted interference has been observed. There are several ways to achieve this, the simplest being a threshold-based approach that is set based on observing multiple valid responses without targeted interference.

The above-described method for detecting targeted radar interference enables lightweight, real-time detection of targeted interference attacks. This helps to protect the security properties of radar systems in the field.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting interference in a radar system, the method comprising:
   selecting, by the radar system, a selected transmission interval from a sequence of consecutive transmission intervals that includes
      multiple first transmission intervals immediately before the selected transmission interval,
      the selected transmission interval, and
      multiple second transmission intervals immediately after the selected transmission interval;
   transmitting, by a transmitter of the radar system, a radar pulse having a predetermined magnitude during each of the multiple first transmission intervals;
   refraining, by the transmitter, from transmitting the radar pulse having the predetermined magnitude during the selected transmission interval;
   transmitting, by the transmitter, the radar pulse having the predetermined magnitude during each of the multiple second transmission intervals;
   enabling a receiver to receive reflected radar pulses during a reception interval immediately following the selected transmission interval; and determining, using a threshold-based approach, whether a reflected radar pulse with a sufficient strength has been received during the reception interval.

2. The method of claim 1, further comprising providing an indication of a false reflection when the determining step determines that the reflected radar pulse with the sufficient strength has been received during the reception interval.

3. The method of claim 1, wherein refraining from transmitting the radar pulse having the predetermined magnitude during the selected transmission interval comprises either completely refraining from transmitting the radar pulse during the selected transmission interval, or transmitting a radar pulse that has a lower magnitude than the predetermined magnitude.

4. The method of claim 1, wherein the radar system is an Impulse Radio Ultra-Wideband (IR-UWB) radar system.

5. The method of claim 1, wherein the method is implemented as a computer program comprising instructions stored in a non-transitory storage medium, wherein when executed by a processor of the radar system, the instructions perform the method.

6. The method of claim 1, wherein selecting the selected transmission interval further comprises randomly selecting the selected transmission interval.

7. The method of claim 1, further comprising analyzing received reflected radar pulses for target range from the radar system.

8. The method of claim 6, wherein randomly selecting the selected transmission interval includes randomly selecting the selected transmission interval based on a biased distribution.

9. A method for detecting interference in a radar system, the method comprising:
enabling a sequence of transmission steps of a transmitter of the radar system at a regular interval, wherein rest periods are interleaved between adjacent transmission steps;
enabling a sequence of reception steps of a receiver of the radar system, a reception step corresponding to each of the rest periods;
randomly selecting a selected transmission step from the sequence of transmission steps;
transmitting, by the transmitter, a radar pulse during each of the transmission steps of the sequence of transmission steps except for the selected transmission step;
refraining from transmitting, by the transmitter, the radar pulse during the selected transmission step;
receiving, by the receiver, reflections during the sequence of reception steps;
determining, using a threshold-based approach, whether an unexpected reflection with a sufficient strength has been received during a reception step immediately following the selected transmission step; and
providing an indication of interference in response to determining that the unexpected reflection with the sufficient strength has been received during the reception step immediately following the selected transmission step.

10. The method of claim 9, wherein randomly a selecting the selected transmission step from the sequence of transmission steps further comprises randomly selecting the selected transmission step based on a biased distribution.

11. The method of claim 9, wherein in response to receiving the unexpected reflection, analyzing the unexpected reflection for targeted interference by an attacker.

12. The method of claim 9, further comprising analyzing received reflected radar pulses for target range from the radar system.

13. A radar system comprising:
a random number generator configured to produce a sequence of numbers;
a transmitter configured to transmit a radar pulse during an upcoming transmission interval when a number in the sequence of numbers has a first value, and to refrain from transmitting the radar pulse during the upcoming transmission interval when the number has a second value;
a receiver configured to receive reflected signals from a target during a rest period immediately following the upcoming transmission interval; and
a processor coupled the receiver, the processor configured to determine whether the receiver has received a reflected signal with a sufficient strength during the rest period, and, when the number has the second value and the processor has determined that the receiver has received the reflected signal with the sufficient strength during the rest period, to raise an alert.

14. The radar system of claim 13, wherein the transmitter and the receiver form portions of an impulse radio ultra-wideband (IR-UWB) radar transceiver.

15. The method of claim 6, wherein randomly selecting the selected transmission interval comprises:
producing a sequence of numbers by a random number generator of the radar system, wherein each number of the sequence of numbers corresponds to a transmission interval of the sequence of consecutive transmission intervals;
when a number in the sequence of numbers has a first value, refraining from selecting a transmission interval corresponding to the number as the selected transmission interval; and
when the number in the sequence of numbers has a second value, selecting the transmission interval corresponding to the number as the selected transmission interval.

16. The radar system of claim 13, wherein:
the random number generator is configured to produce the series of numbers by sampling from a biased distribution in which the probability of sampling the first number is higher than the probability of sampling the second number.

17. The radar system of claim 13, wherein:
the random number generator is configured to produce the series of numbers by randomly sampling a switch.

18. The radar system of claim 13, wherein:
the processor is configured to use a threshold-based approach to determine whether the receiver has received the reflected radar pulse with the sufficient strength during the rest period.

19. The radar system of claim 13, wherein the radar system is an Impulse Radio Ultra-Wideband (IR-UWB) radar system.

* * * * *